(12) United States Patent
Kitsutaka et al.

(10) Patent No.: US 6,532,083 B1
(45) Date of Patent: Mar. 11, 2003

(54) IMAGE READING APPARATUS

(75) Inventors: Eiji Kitsutaka, Fukuoka (JP); Junichiro Honda, Kasuga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/182,627

(22) Filed: Oct. 30, 1998

(30) Foreign Application Priority Data

Oct. 31, 1997 (JP) ............................................. 9-300129

(51) Int. Cl.[7] ................................................. H04N 1/04
(52) U.S. Cl. ........................ 358/474; 382/312; 348/316; 250/208.1
(58) Field of Search ................................ 358/474, 473, 358/497, 442, 498, 446, 471, 482, 483; 382/312, 323

(56) References Cited

U.S. PATENT DOCUMENTS

| | | | | |
|---|---|---|---|---|
| 4,449,147 A | * | 5/1984 | Ogasawara | ................. 358/212 |
| 5,308,970 A | * | 5/1994 | Pool | ........................ 250/208.1 |
| 5,646,745 A | * | 7/1997 | Kajitani | ...................... 358/448 |
| 5,751,438 A | * | 5/1998 | Murai | ........................ 358/403 |
| 5,907,413 A | * | 5/1999 | Han | ............................ 358/497 |

* cited by examiner

Primary Examiner—Jerome Grant, II
Assistant Examiner—Negussie Worku
(74) Attorney, Agent, or Firm—Wenderoth, Lind & Ponack, L.L.P.

(57) ABSTRACT

Four photo-sensor blocks, for instance, are arrayed in series in a main scan direction within a sensor unit. In each photo-sensor block, 1280 photo sensors, for instance, are arrayed linearly. The adjacent photo-sensor blocks are placed so that they read image data in reverse directions with each other. The read-out image data are once stored in a buffer, and re-arrayed in the order corresponding to the main scan direction of the document before the data are read out from the buffer.

15 Claims, 10 Drawing Sheets

IMAGE READING APPARATUS

FIELD OF THE INVENTION

The present invention relates to an image reading apparatus that reads out images on documents.

BACKGROUND OF THE INVENTION

Prevailing of the electronic filing system in the market entails more attention focused on the image reading apparatus as an input device. The image reading apparatus employed in the electronic filing system is demanded to read documents at a higher speed for improving work efficiency. For the further prevailing of electronic filing systems in offices, the image reading apparatus is demanded to be smaller in size and less expensive.

The image reading apparatus employs an image sensor to read images of documents. There are two types of image sensors, one is a CCD image sensor and the other one is a contact-type image sensor. Each has respective advantages and disadvantages. The CCD image sensor reads fast but costs expensive and is difficult to be reduced in size. On the other hand, the contact-type image sensor costs inexpensive and is easy to be reduced in size, but reads not so fast.

In this present situation, various ideas are proposed to realize an image sensor capable of fast reading, inexpensive cost and compact size. Among these ideas, the following method is effective to satisfy this object, i.e. the contact-type image sensor is driven block by block so that a higher reading speed is obtained.

Figure 11:
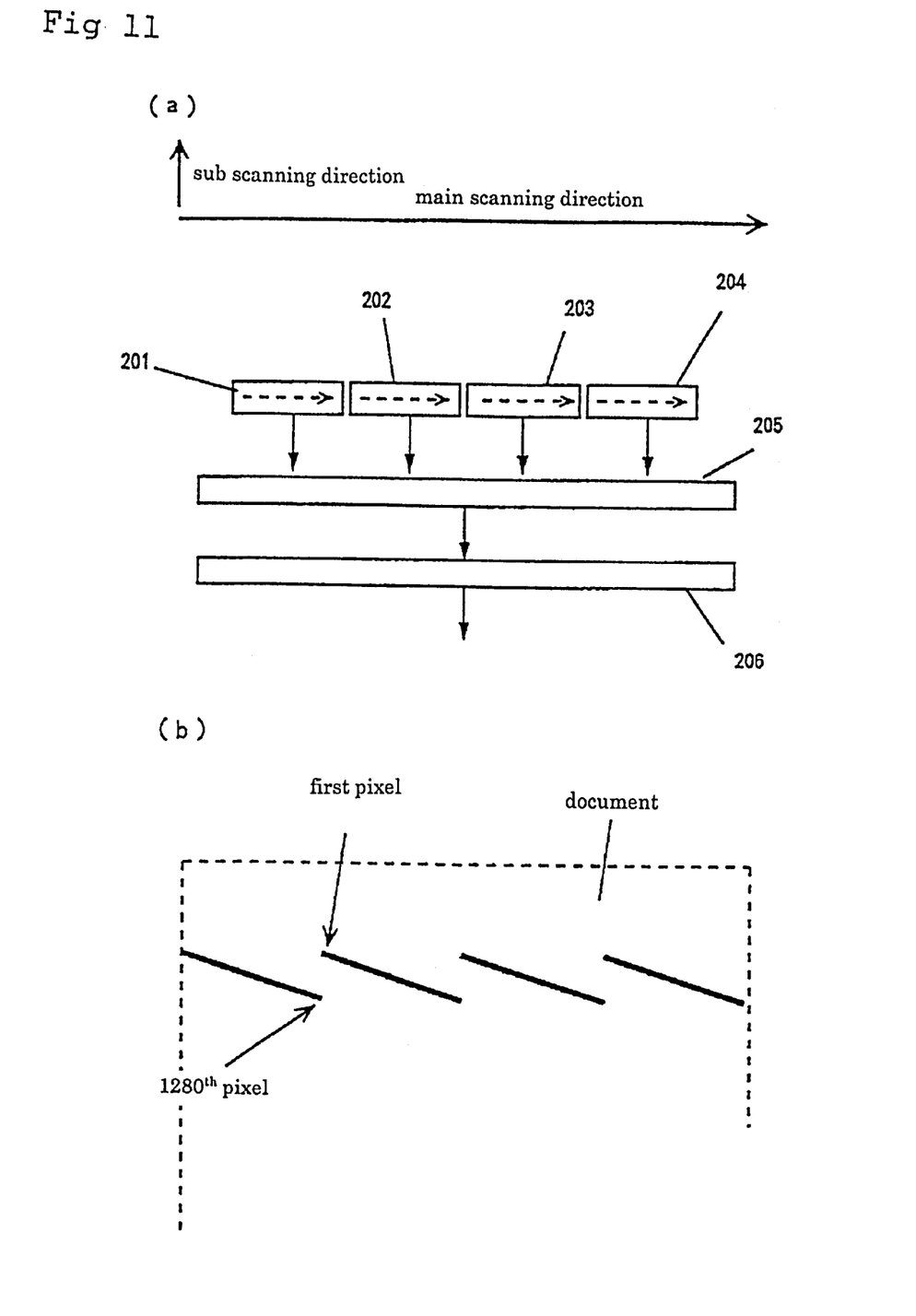
FIG. 11 is a block diagram of a reader, which employs contact-type-image-sensors, of the image reading apparatus.

FIG. 11(a) is a block diagram that illustrates a reader employing a contact-type image sensor in a conventional image reading apparatus. As shown in FIG. 11(a), four contact-type image sensors 201, 202, 203, and 204 are arrayed in series in the main scan direction. Each of the above image sensors has 1280 pixels arrayed linearly. These contact-type image sensors are driven independently to read the image data on one line of the document. The image data on each line of the document is divided into four sections for being read out by the image sensors. The respective outputs from each of the contact-type image sensors are converted to serial data by an analog switch 205 besides functioning as a shift register, and then written into a buffer 206. Before being read out from the buffer 206, the serial data are re-arrayed in a normal pixel order, then supplied to an image processing circuit such as A/D converter.

As such, a time for reading one line is shortened through dividing one line into four sections (in the above-case, read-out time is shortened to ¼.) However, delays in reading occur between the pixels, whereby the resultant image data as shown in FIG. 11(b) are not continuous between each image sensor.

In other words, the image data, which are obtained through the block-driven method as shown in FIG. 11(b), progress of being read out also in a sub-scan direction while the image data progress of being read out in the main scan direction, thereby to produce discontinuity between each image sensor. In the case of reading binary images such as letters and symbols, there is no practical problems; however, in the case of reading an image including some gray scale such as a photographic document, which is supposed to undergo a dither process and an error-diffusion process, practical problems occur. That is to say, a vertical line appears in the pixel-discontinued-space.

The present invention addresses this problem and aims to provide an image reading apparatus that can avoid producing the discontinuity of pixels between each contact-type image sensor when one line of a document is read out. The image reading apparatus of the present invention also embodies a compact size, inexpensive cost, and higher process speed.

SUMMARY OF THE INVENTION

A first image reading apparatus of the present invention comprises:
- document feeding device operable to feed documents;
- document transmission device operable to transmit the documents fed by the document feeding device; and
- reading device operable to read out an image on the document transmitted by the document transmission device.

In this reading device, plural contact type image sensors are arrayed in series in the main scan direction, and yet, a reading direction of each adjacent image sensor is set in a reverse direction with each other. Each image sensor comprises plural photo-sensors arrayed linearly.

A second image reading apparatus of the present invention further comprises a buffer operable to store image data. The image data that have been read out by the contact type image sensors are once stored in this buffer, and the stored image data are read out in the order corresponding to the main scan direction so that each pixel data is re-arrayed.

These structures can avoid producing discontinuity of pixels between each image sensor when plural contact-type-image-sensors read one line of a document through dividing the one line into plural blocks. These structures realize quality readout as well as allow the image reading apparatus to be smaller, less expensive, and faster in process.

DESCRIPTION OF THE PREFERRED EMBODIMENT

The exemplary embodiment of the present invention is described hereinafter with reference to the accompanying drawings.

Figure 1:
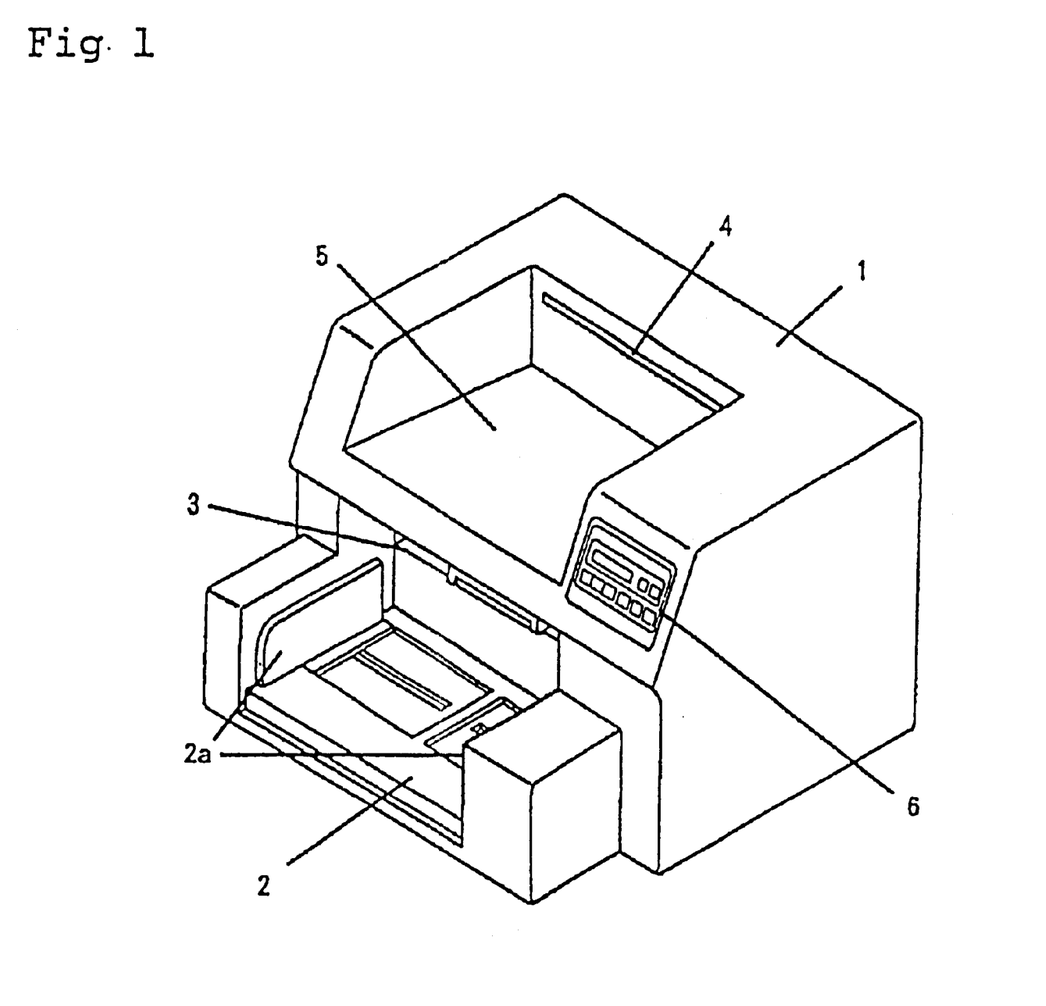
FIG. 1 shows a perspective outward appearance of an image reading apparatus utilized in an exemplary embodiment of the present invention.

FIG. 1 is a perspective outward appearance of an image reading apparatus utilized in the exemplary embodiment of the present invention. A hopper table 2 is attached to the front face of housing 1 of the image reading apparatus. The documents to be read out are stacked on this hopper table 2. A document feeding slit 3 is also provided on the front face of the housing 1. This slit 3 is used for feeding the document on the hopper table 2 into the housing 1. A document discharging slit 4 is provided on the front face of the housing 1. This slit 4 is used for discharging a document already read out from the housing 1. An input section 6 for inputting commands or setting conditions is also provided on the front face of the housing 1. On the hopper table 2, a document sliding guide 2a that can be slid in the width direction of the document is provided. The hopper table 2 can be moved up and down depending on a quantity of the documents provided thereon.

Figure 2:
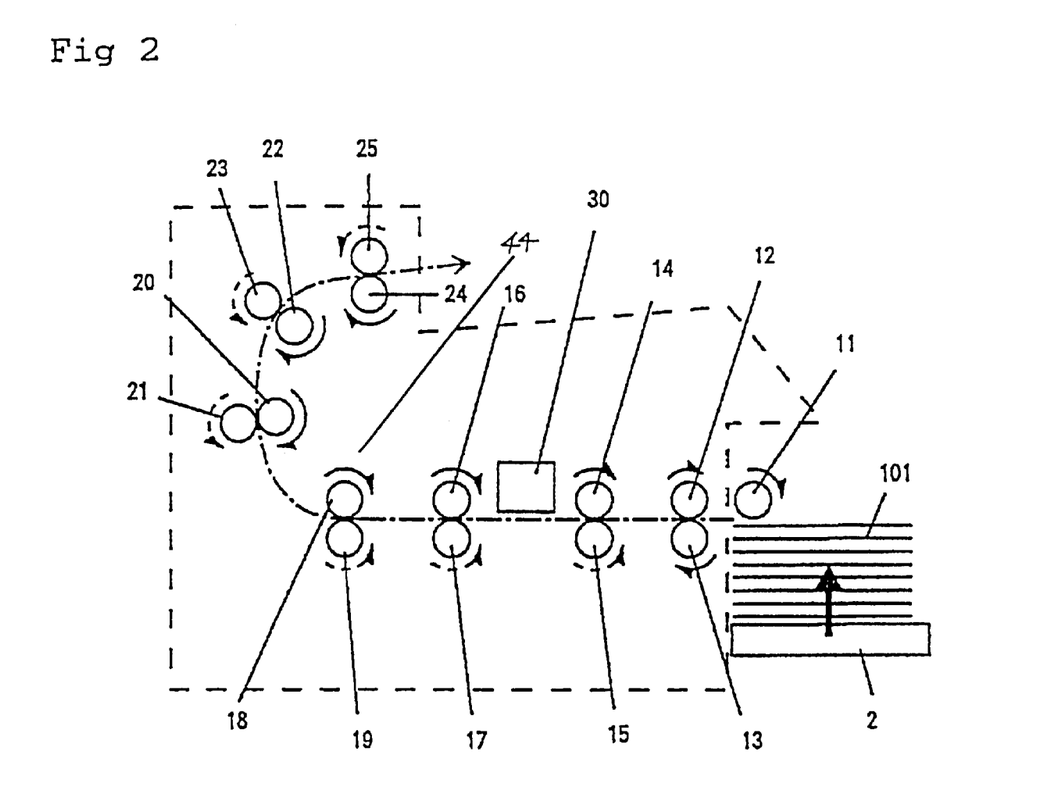
FIG. 2 is a cross sectional side view illustrating a structure of the image reading apparatus shown in FIG. 1.
Figure 3:
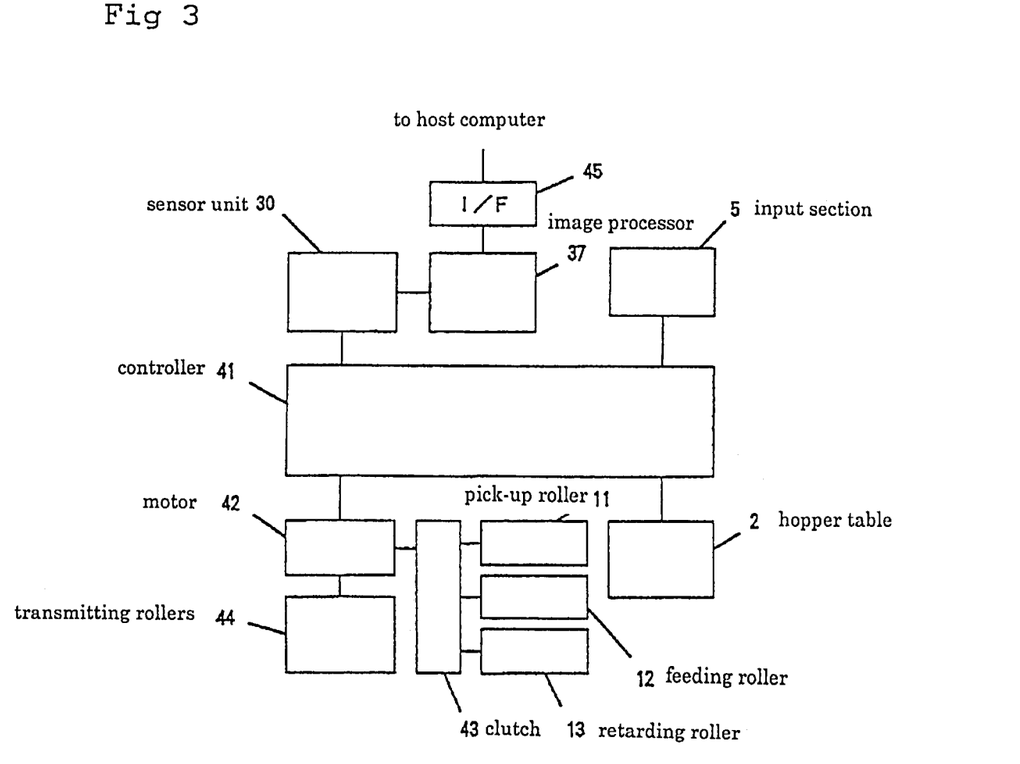
FIG. 3 is a block diagram depicting how to control the image reading apparatus.

FIG. 2 is a cross sectional side view illustrating a structure of the image reading apparatus used in this exemplary embodiment, and FIG. 3 is a block diagram depicting how to control the image reading apparatus.

A pick-up roller 11 sends out the upper most sheet of the stacked documents 101 on the hopper table 2. A document feeding roller 12 feeds the document 101, which is sent out by the pick-up roller 11, into the housing 1. A retarding roller 13 spins in reverse direction to the document feeding direction, thereby to prevent the document 11 from being sent out overlapped.

Transmission rollers 44 comprise moving rollers 14, 16, 18, 20, 22 and 24. Slave rollers 15, 17, 19, 21, 23 and 25 are subjected to the above respective moving rollers. These transmission rollers 44 together with the slave rollers transmit the document 101. During this transmission by these rollers 44 including the roller 14 and others, a main sensor unit 30 having at least a reading width (main scan direction) for one line of the document 101 reads the image information on the document 101.

In FIG. 2, the arrow marks in solid lines indicate rotary directions of the pick-up roller 11 and document feeding roller 12 which are driven by a motor 42 (described later). The arrow marks in broken lines, on the other hand, indicate rotary directions of the slave roller 15 and others which are subjected to the moving roller 14 and others. The chain line in FIG. 2 indicates the transmission path of document 101.

The pick-up roller 11, document feeding roller 12, and retarding roller 13 are coupled to the motor 42 via a clutch 43. The transmission rollers 44 comprising the moving rollers 14, 16, 18, 20, 22 and 24 are connected to the motor 42 free from the clutch 42. Therefore, when the motor is kept driving, the pick-up roller 11, document feeding roller 12 and retarding roller 13 can be rotated or stopped by activating/inactivating the clutch 43.

The image information read out by the sensor unit 30 is processed by an image processor 37, and supplied to a host computer (not shown) via an interface 45. A controller 41 controls an entire image reading apparatus.

Figure 4:
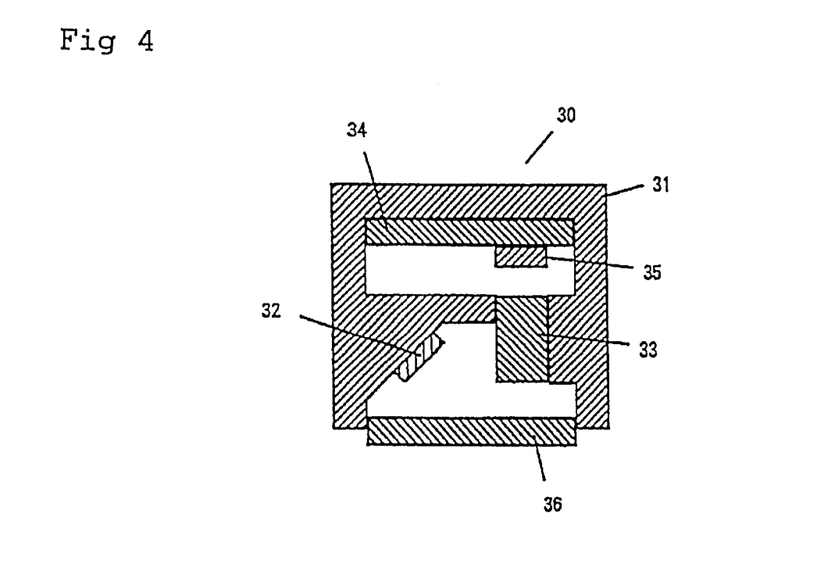
FIG. 4 is a cross section of a sensor unit employed in the image reading apparatus.

The structure of sensor unit 30 is shown in the cross section in FIG. 4.

The following elements are mounted to the sensor frame 31.

(a) a line light source 32 having LEDs arrayed linearly in the main scan direction;
(b) a rod-lens array 33 of m=1 and producing an erect image;
(c) a sensor substrate 34; and
(d) a glass board 36 located above the transmitted face of the documents 101.

The rod-lens array comprising of plural rod lenses (not shown) is disposed opposite to the line light source 32. Plural photo-sensor blocks 35 are arrayed in the main scan direction on the sensor substrate 34.

Operations of sensor unit 30 and image processor 37 are described hereinafter with reference to FIGS. 5 and 6.

Figure 5:
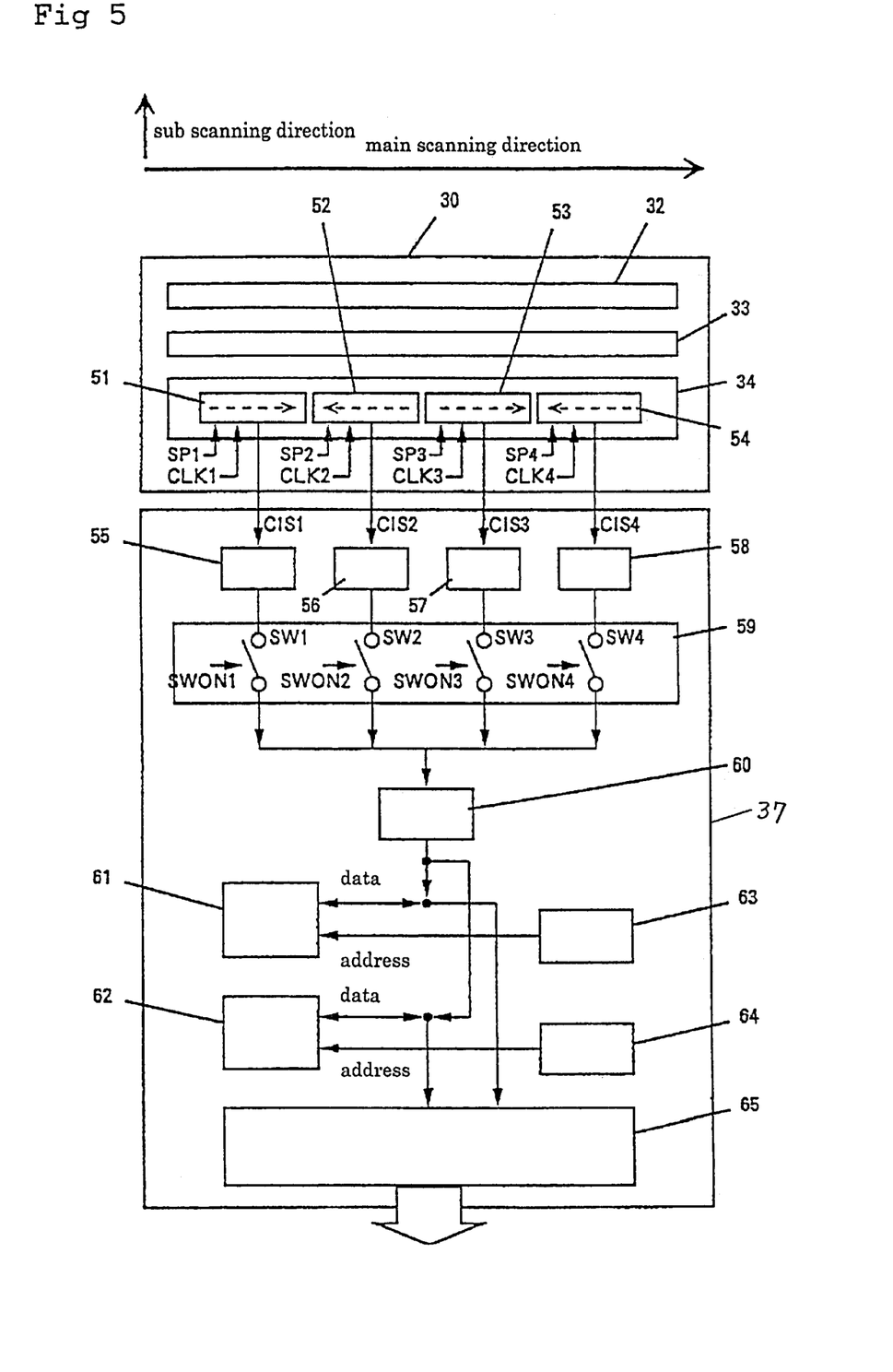
FIG. 5 is a block diagram of an image processor employed in the sensor unit of the image reading apparatus.
Figure 6:
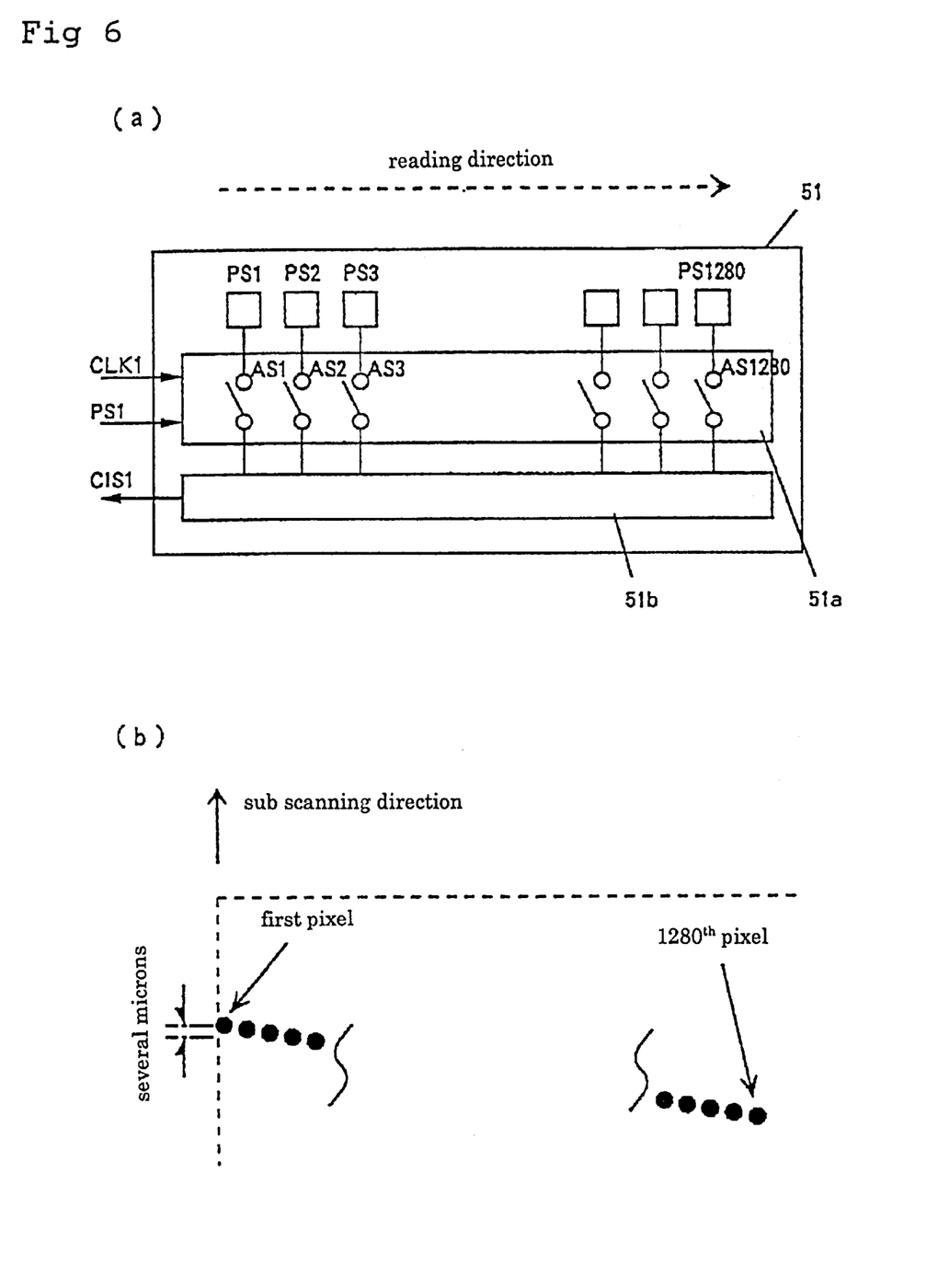
FIG. 6(a) is a block diagram illustrating a photo-sensor-block of the image reading apparatus.
FIG. 6(b) is an illustrative chart thereof.

Four photo-sensor blocks 51, 52, 53 and 54 shown in FIG. 5 are arrayed on the sensor substrate 34 in series in the main scan direction. The substrate 34 is mounted in the sensor unit 30. The line light source 32 for supplying light in order to read the document 101, and the rod-lens array 33 of m=1 and producing an erect image are provided to these photo-sensor blocks 51 to 54.

The photo-sensor block 51 comprises 1280 photo-sensors, i.e. PS1 to PS 1280. An analog switch 51a comprises 1280 switches i.e. AS1 to AS1280 corresponding to output from the photo-sensors. An output from each photosensor is tapped off from respective analog switches as an image data CIS.

When receiving an input of a start pulse SP1, the analog switch 51a switches respective switches AS1 to AS 1280 sequentially by synchronizing a clock pulse CLK1. In other words, inputs to a shift register 51b are tapped off from photo sensor PS1–PS1280, and the outputs are sequentially switched.

Data of each pixel are tapped off from the shift register 51b as serial image data CIS1. The data of each pixel have been read out in the read-out direction indicated with a broken line in FIG. 6(a). In actuality, since the document 101, an object of reading, moves in a sub-scan direction, respective outputs from each photo-sensor PS1 to PS1280 are not the same as the original pixels on the line in the main scanning direction of the document. However, a gap between pixels is as little as several microns as shown in FIG. 6(b), which does not negatively affect an actual process and output.

In the image reading apparatus used in this exemplary embodiment, adjacent photo-sensor blocks are so arrayed in series that reading directions of the adjacent blocks are opposite with each other as shown in FIG. 5. In other words, the blocks 51 and 53 are arrayed so as to read images in the same direction as the main scan direction. On the other hand, the blocks 52 and 54 are arrayed so as to read images in the reverse direction to the main scan direction.

Respective outputs CIS1, CIS2, CIS3 and CIS4 from the photo-sensor blocks 51, 52, 53 and 54 are fed into a switch unit 59 via respective amplifying circuits 55, 56, 57 and 58. The switch unit 59 turns on respective switches SW1, SW2, SW3 and SW4 sequentially with some time-lag so that the above image-data-output CIS1 to CIS4 are converted to serial data, and the resultant data is supplied to an A/D converter 60.

Figure 7:
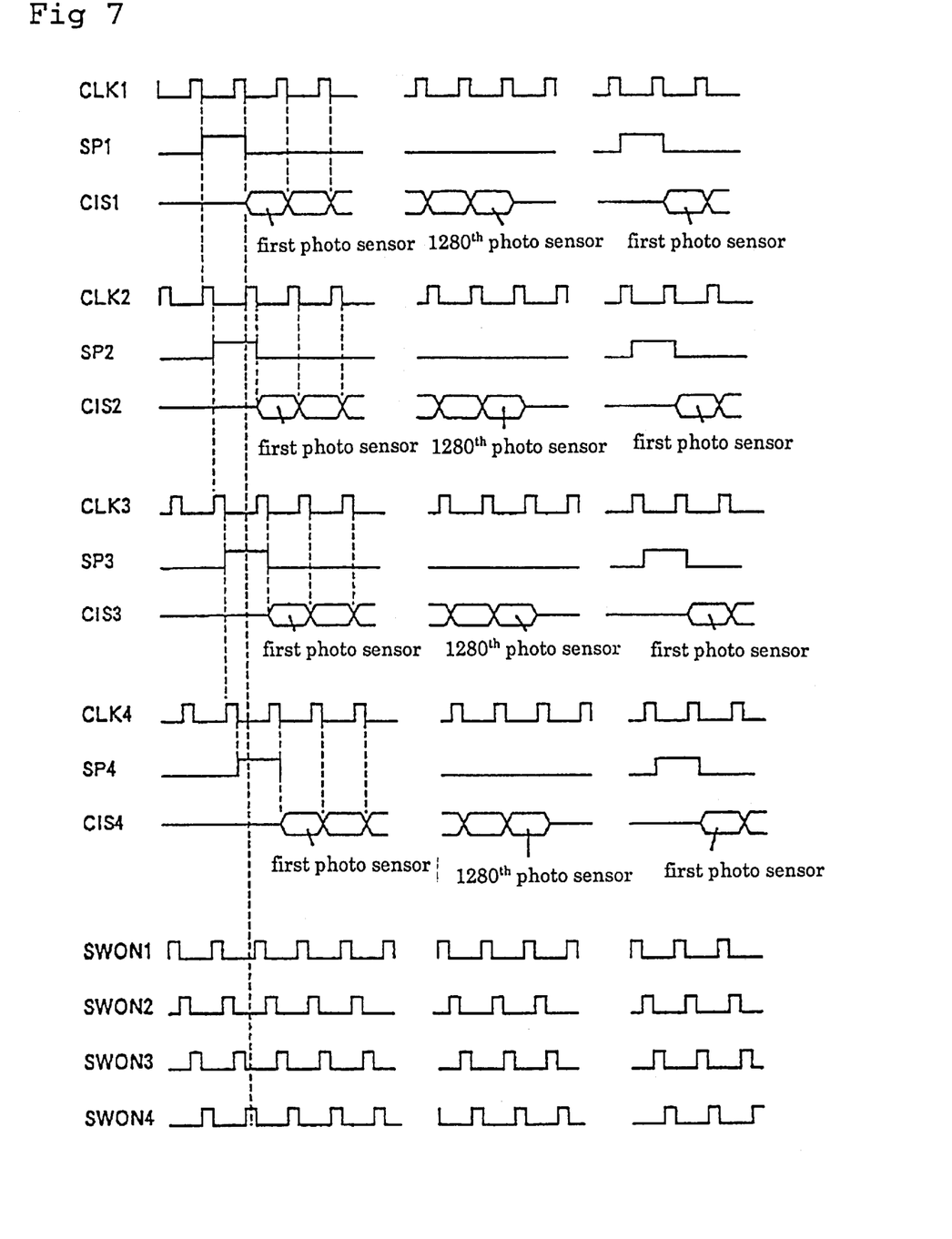
FIG. 7 is a timing chart illustrating an operation of the image reading apparatus.

The controller 41 staggers a timing between clock pulses CLK1 to CLK4 and respective start pulses SP1 to SP4, both types of pulses are supplied to the respective photo-sensor blocks 51 to 54. The controller 41 also switches the respective switches SW1 to SW4 of the switch unit 59 sequentially using signals SWON1 to SWON4 of which timings are staggered, thereby to give serial inputs to the A/D converter 60. As a result, the A/D converter 60 supplies serial outputs.

The output from the A/D converter 60 undergoes binarization and compression processes in an image processing circuit 65 via a buffer 61 or 62. Then the resultant output is supplied to the host computer via the interface (I/F) 45. In order to reduce the data process time, write-in and read-out operations alternate with each other by using plural buffers 61 and 62.

Figure 8:
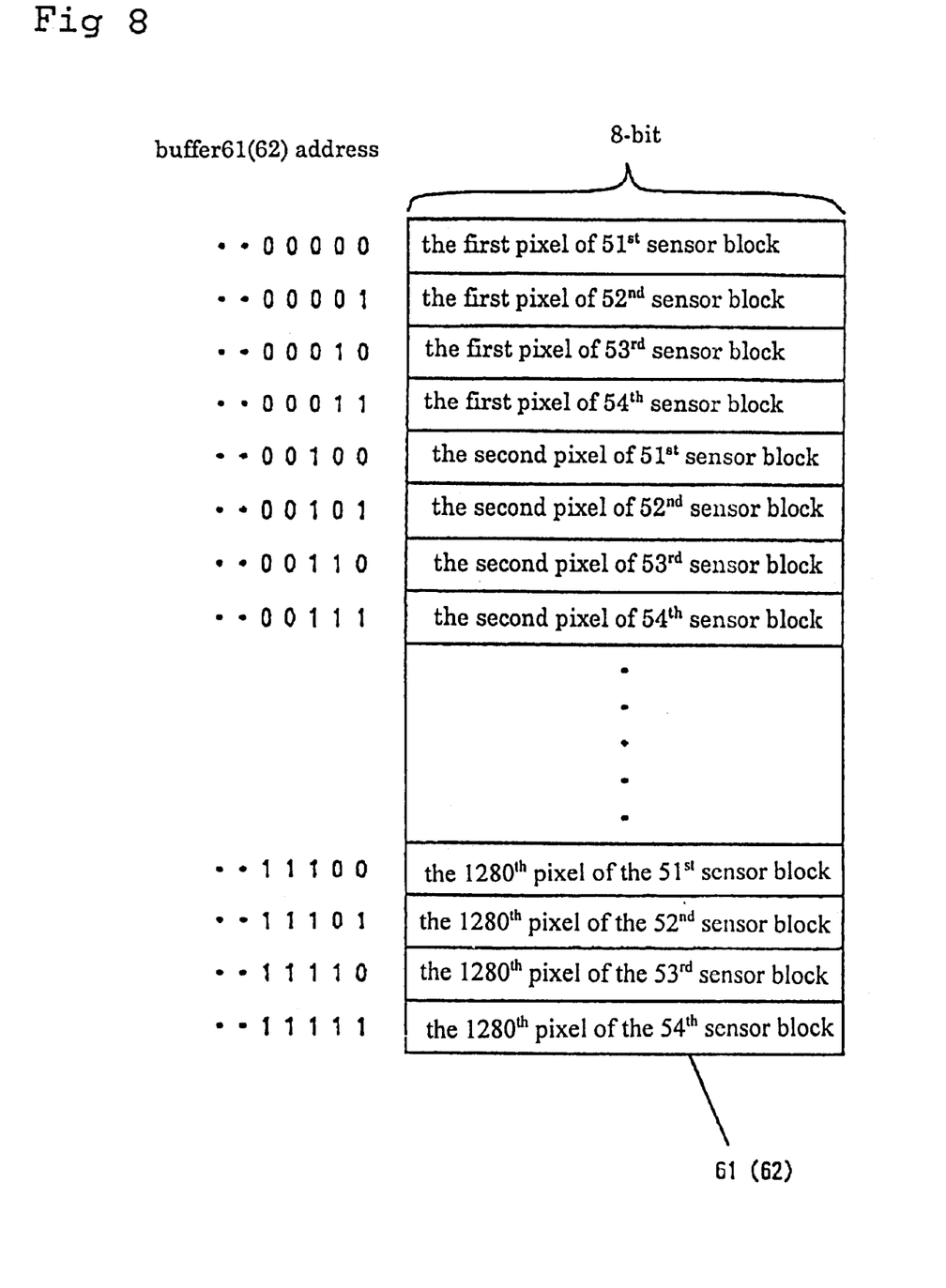
FIG. 8 illustrates a structure of data in a buffer of the image reading apparatus.

As described above, the image reading apparatus of this embodiment reads the data of one line by dividing the data into four blocks, and the read-out directions of adjacent blocks are reverse with each other. Therefore, as shown in FIG. 8, the image data written in the buffer 61 or 62 are not in the order of main scan direction of the document. The read-out addresses must be controlled by address producing circuits 63 and 64 so that the data stored in the buffer are re-arrayed in the order corresponding to the image of document 101.

In this exemplary embodiment, four photo-sensor blocks are employed. Firstly, fix the lower two address bits of the buffer 61 or 62 at "00", and read out each pixel sequentially, which the photo-sensor block 51 has read out, by increasing the other upper bits. After the $1280^{th}$ pixel is read out, increase the lower two address bits and fix the two bits at "01". Then read out each pixel sequentially, which the photo-sensor block 52 has read out, by decreasing the other upper bits from $1280^{th}$ pixel to the first pixel.

Figure 9:
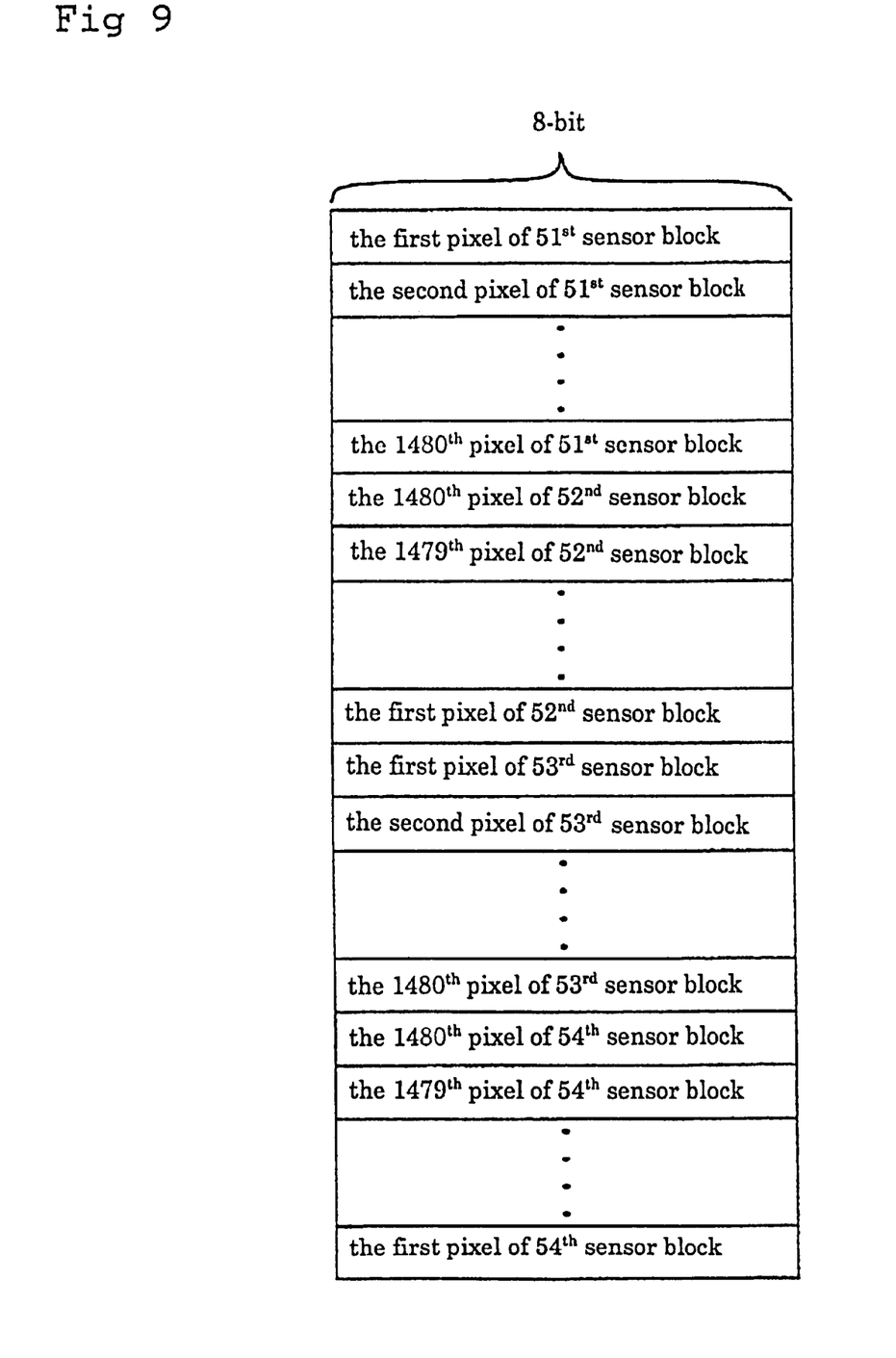
FIG. 9 illustrates a structure of output data of the image reading apparatus.

In the same manner, each pixel of photo-sensor block 53 are read out sequentially by increasing upper bits other than the lower two address bits that are fixed at "10". Each pixel of photo-sensor block 54 are read out sequentially by decreasing upper bits other than the lower two address bits that are fixed at "11". Through this procedure, every pixel constituting the one line are re-arrayed as shown in FIG. 9, and supplied to the image processing circuit 65.

Figure 10:
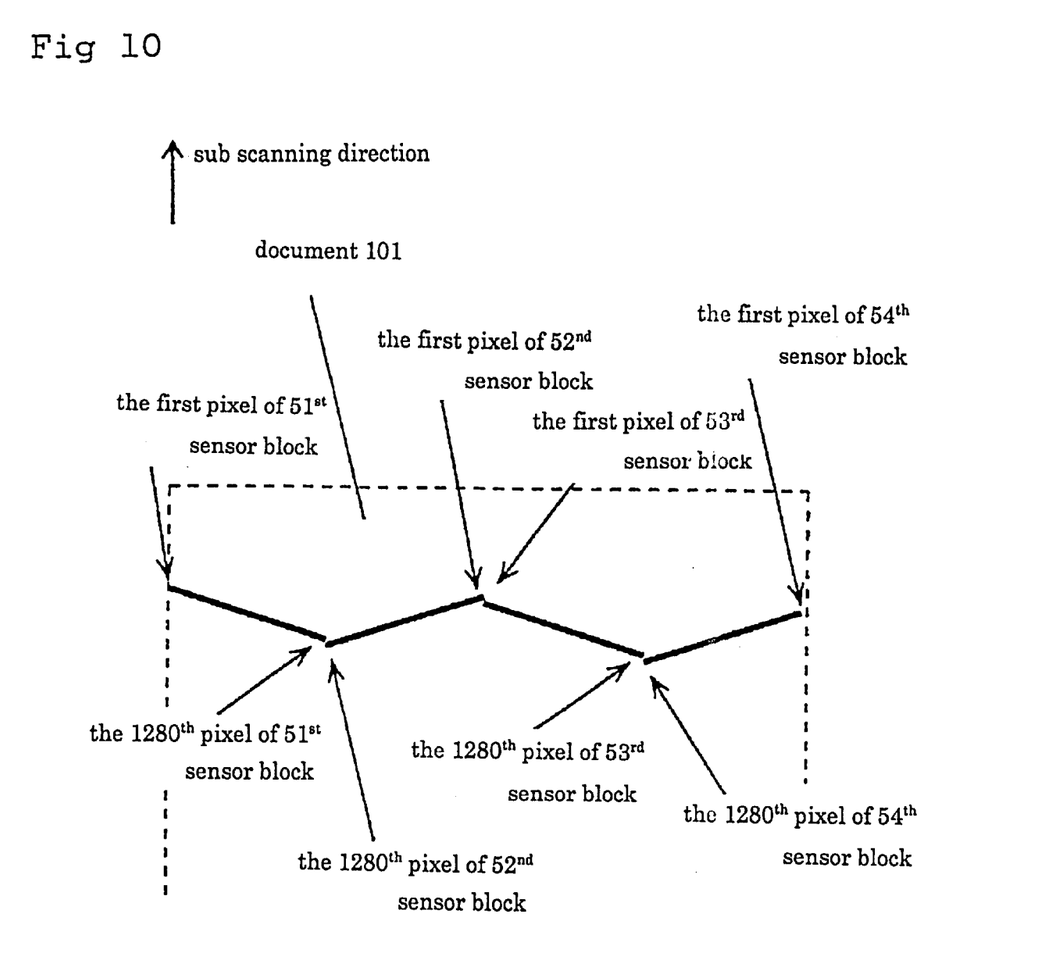
FIG. 10 depicts an image data that are read out by the image reading apparatus.

Through the above process, an image can be read out at a higher speed, and also a quality output can be obtained. FIG. 10 illustrates this process. For instance, the photo-sensor block 51 sequentially reads pixels from the first one to the $1280^{th}$ pixel in the main scan direction. On the other hand, the photo-sensor block 52 reads 1280 pixels in reverse direction to the main scan direction. The $1280^{th}$ pixel covered by the photo-sensor block 51 and the $1280^{th}$ pixel covered by the photo-sensor block 52 are read out substantially at the same time, therefore, there is no extreme gap between adjacent pixels in sub-scan direction. This is applicable also to the blocks 53 and 54.

The present invention thus can provide an image reading apparatus where plural contact-type photo-sensor blocks are arrayed in series in the main scan direction, and each block is driven independently so that adjacent blocks read data in reverse directions with each other. The read-out data are once stored in a buffer, and are re-arrayed in the order corresponding to the main scan direction of the image of the document before the data are read out from the buffer. This process can avoid producing an extreme gap among the pixels of one line data, thereby to produce a quality output at a higher speed. At the same time, a compact size and inexpensive cost can be expected.

The construction and the numbers used in this exemplary embodiment are just the examples, and the present invention is not limited to these examples. Various changes and modifications may be made without departing from the spirit of the invention as set forth in the subjoined claims that follow.

What is claimed is:

1. An image reading apparatus comprising:
   document feeding means for feeding a document;
   document transmission means for transmitting the document fed by said document feeding means; and
   reading means for reading an image on the document transmitted by said document transmission means;
   wherein said reading means comprises a plurality of contact-type image sensors in which photo sensors are arrayed linearly, said plurality of contact-type image sensors are arrayed in series in a main scan direction of the document so that adjacent ones of said plurality of contact-type image sensors read data in reverse directions with each other.

2. The image reading apparatus as defined in claim 1 further comprising:
   a buffer for storing image data;
   wherein the image data read out by said plurality of contact-type image sensors are once stored in said buffer, and the stored image data are read out in the order corresponding to the main scan direction of the document so that each pixel is re-arrayed.

3. An image reading apparatus as defined in claim 2, further comprising address producing means for controlling read-out addresses of said buffer so that data stored in said buffer are re-arrayed in the order corresponding to the image of the document.

4. An image reading apparatus as defined in claim 1, wherein each of said plurality of contact-type image sensors comprise 1280 photo sensors.

5. An image reading apparatus as defined in claim 1, wherein a switching means is provided for each of said photo sensors to control an output thereof.

6. An image reading apparatus comprising:
   document feeding device operable to feed a document;
   document transmission device operable to transmit the document fed by said document feeding device; and
   reading device operable to read an image on the document transmitted by said document transmission device;
   wherein said reading device comprises a plurality of contact-type image sensors in which photo sensors are arrayed linearly, said plurality of contact-type image sensors are arrayed in series in a main scan direction of the document so that adjacent ones of said plurality of contact-type image sensors read data in reverse directions with each other.

7. An image reading apparatus as defined in claim 6, further comprising:
   a buffer operable to store image data;
   wherein the image data read out by said plurality of contact-type image sensors are once stored in said buffer, and the stored image data are read out in the order corresponding to the main scan direction of the document so that each pixel data is re-arrayed.

8. An image reading apparatus as defined in claim 7, further comprising address producing circuits which control read-out addresses of said buffer so that data stored in said buffer are re-arrayed in the order corresponding to the image of the document.

9. An image reading apparatus as defined in claim 6, wherein each of said plurality of contact-type image sensors comprise 1280 photo sensors.

10. An image reading apparatus as defined in claim 6, wherein a switch is provided for each of said photo sensors to control an output thereof.

11. An image reading method for reading an image on a document using an image reading apparatus having a reading device which comprises a plurality of contact-type image sensors in which photo sensors are arrayed linearly, and wherein the plurality of contact-type image sensors are arrayed in series in a main scan direction of the document, said method comprising:
   feeding a document into the image reading apparatus;
   transmitting the document which has been fed into the image reading apparatus to the reading device; and reading an image on the document using the reading device so that adjacent ones of the plurality of contact-type image sensors read data in reverse directions with each other.

12. An image reading method as defined in claim 11, wherein the image data read out by the plurality of contact-type image sensors are once stored in a buffer, and the stored image data are read out in the order corresponding to the main scan direction of the document so that each pixel data is re-arrayed.

13. An image reading method as defined in claim 12, wherein the image reading apparatus further comprises address producing circuits, said method further comprising:

controlling read-out addresses of the buffer using the address producing circuits so that data stored in the buffer are re-arrayed in the order corresponding to the image of the document.

14. An image reading method as defined in claim 11, wherein each of the plurality of contact-type image sensors comprise 1280 photo sensors.

15. An image reading method as defined in claim 11, wherein a switch is provided for each of the photo sensors, said method further comprising:

controlling an output of each of the photo sensors using the respective switch provided thereto.

* * * * *